(12) United States Patent
Hethuin et al.

(10) Patent No.: US 8,170,139 B2
(45) Date of Patent: May 1, 2012

(54) STRENGTHENED FREQUENCY HOPPING COMMUNICATION METHOD AND DEVICE (75) Inventors: Serge Hethuin, Courbevoie (FR); Adrien Duprez, Paris (FR)

(73) Assignee: Thales (FR)

( * ) Notice: Subject to any disclaimer, the term of this patent is extended or adjusted under 35 U.S.C. 154(b) by 618 days.

(21) Appl. No.: 12/298,772

(22) PCT Filed: Apr. 27, 2007

(86) PCT No.: PCT/EP2007/054144
§ 371 (c)(1),
(2), (4) Date: Feb. 17, 2009

(87) PCT Pub. No.: WO2007/125093
PCT Pub. Date: Nov. 8, 2007

(65) Prior Publication Data
US 2009/0185600 A1 Jul. 23, 2009

(30) Foreign Application Priority Data
Apr. 28, 2006 (FR) ...................................... 06 03866

(51) Int. Cl.
H04L 27/00 (2006.01)
H04J 3/02 (2006.01)
H04K 1/10 (2006.01)
H04L 27/28 (2006.01)
H04B 1/00 (2006.01)

(52) U.S. Cl. ........ 375/295; 375/260; 375/130; 375/132; 375/133; 375/134; 370/203; 370/431; 370/464

(58) Field of Classification Search ................ 375/295
See application file for complete search history.

(56) References Cited

U.S. PATENT DOCUMENTS

| | | | |
|---|---|---|---|
| 7,230,931 B2 * | 6/2007 | Struhsaker | 370/280 |
| 7,437,164 B2 * | 10/2008 | Agrawal et al. | 455/446 |
| 2003/0119534 A1 * | 6/2003 | Kostic et al. | 455/501 |
| 2005/0135229 A1 | 6/2005 | Molisch et al. | |
| 2005/0271012 A1 * | 12/2005 | Agrawal et al. | 370/331 |
| 2005/0281317 A1 | 12/2005 | Oh et al. | |
| 2006/0062279 A1 | 3/2006 | Liu et al. | |
| 2006/0133262 A1 * | 6/2006 | Sutivong et al. | 370/209 |
| 2006/0223449 A1 * | 10/2006 | Sampath et al. | 455/69 |
| 2008/0013485 A1 * | 1/2008 | Gorokhov et al. | 370/329 |

OTHER PUBLICATIONS

Moon Fone Wong et al: "Performance Analysis of OFDM/FHMA Hybrid System Operation in ISM Band" Military Communications Conference, 1996. MILCOM '96, Conference Proceedings, IEEE McLean, VA, USA Oct. 21-24, 1996, New York, NY, USA IEEE, US, vol. 2, Oct. 21, 1996, p. 369-373, XP 010203878; ISBN: 0-7803-3682-8.

(Continued)

*Primary Examiner* — Shuwang Liu
*Assistant Examiner* — Gina McKie
(74) *Attorney, Agent, or Firm* — Lowe Hauptman Ham & Berner, LLP (57) ABSTRACT

The invention relates to a frequency hopping communication method in which the data travels over time-variable frequency bearers. A frequency bearer is defined as a subset pair of carriers in a channel of a set of frequency channels (RF). The choice of the frequency bearers is derived from a pseudo-random draw.

12 Claims, 11 Drawing Sheets

OTHER PUBLICATIONS

Hikmet Sari 1997; "Orthogonal Frequency-Division Multiple Access With Frequency Hopping and Diversity" In Multi-Carrier Spread-Spectrum, K. Fazel and G.P. Fetweiss, Eds. Kluwer Academic Publishers, 1997, pp. 57-68.

Hikmet Sari 1997 "Orthogonal Frequency-Division Mulitple Access With Frequency Hopping and Diversity" in Multi-Carrier Spread-Spectrum, K. Fazel and G.P. Fettweiss, Eds. Kluwer Academic Publishers, 1997, pp. 57-68.

* cited by examiner

STRENGTHENED FREQUENCY HOPPING COMMUNICATION METHOD AND DEVICE

CROSS-REFERENCE TO RELATED APPLICATIONS

The present Application is based on International Application No. PCT/EP2007/054144, filed on Apr. 27, 2007, which in turn corresponds to French Application No. 06 03866 filed on Apr. 28, 2006, and priority is hereby claimed under 35 USC §119 based on these applications. Each of these applications are hereby incorporated by reference in their entirety into the present application.

FIELD OF THE INVENTION

The invention relates to a frequency hopping communication method. It applies, for example, for user access to a communication network.

BACKGROUND OF THE INVENTION

The principle of communication by frequency hopping is to transmit data (information, video, speech, etc.) successively over a variety of frequency channels, pseudo-randomly.
In civilian applications, this technique can be introduced to deal in particular with two issues:
  Fading: radio signals are subject to fading, which is approximately distributed according to Rayleigh's law. Since Rayleigh-type fading is frequency-selective, frequency hopping coupled to the channel encoding and to interleaving makes it possible to average the risks of losing information. This improvement in the quality of the transmission link is all the more necessary when the nodes are moving.
  Interference: without frequency hopping, the strong signals obtained from the adjacent cells continuously affect the communication. With random frequency hopping, the cells use pseudo-random hopping sequences, thus making the interference random.

In some network applications, the whole of one and the same network knows a frequency hopping law. A node arriving late in the network is synchronized on the frequency changes and determines the progress in the pseudo-random sequence thanks to the knowledge of the hopping law. A node transmits within a frequency level. Each new level has a corresponding new frequency. A hold time is provided at the start of each level to enable the radio subsystem to synthesize the new frequency. This time is linked to the performance of the synthesizer and to the desired frequency accuracy. Typically, this time varies between 200 µs and a few ms. Certain communication system architectures implement two synthesizers to be faster.

In the Defence and Security domain, the frequency hopping mechanism is used to fight against scrambling and reinforce discretion.

To fight against multiple-paths, various techniques known to those skilled in the art can be used, for example, the techniques of equalization, spectrum-spreading and multiple carriers.

Figure 1:
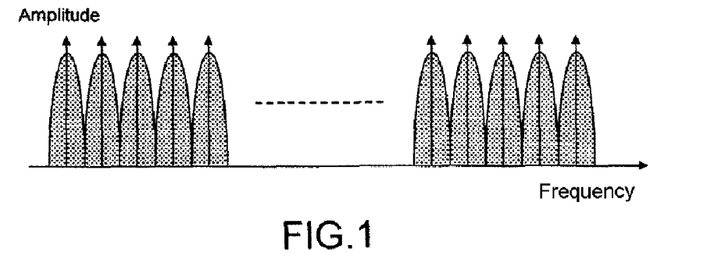
Figure 2A:
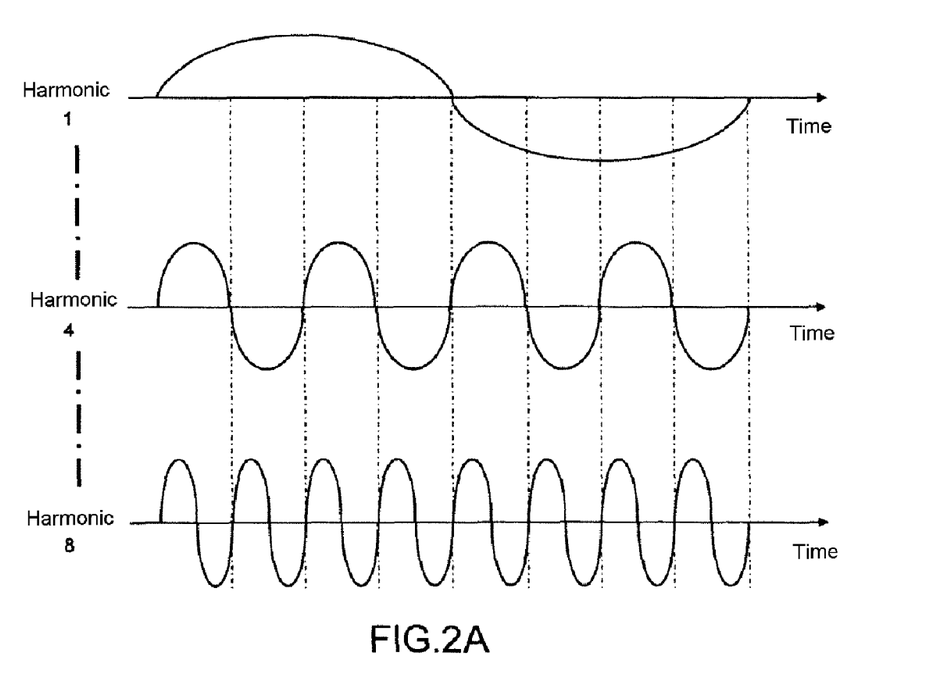
Figure 2B:
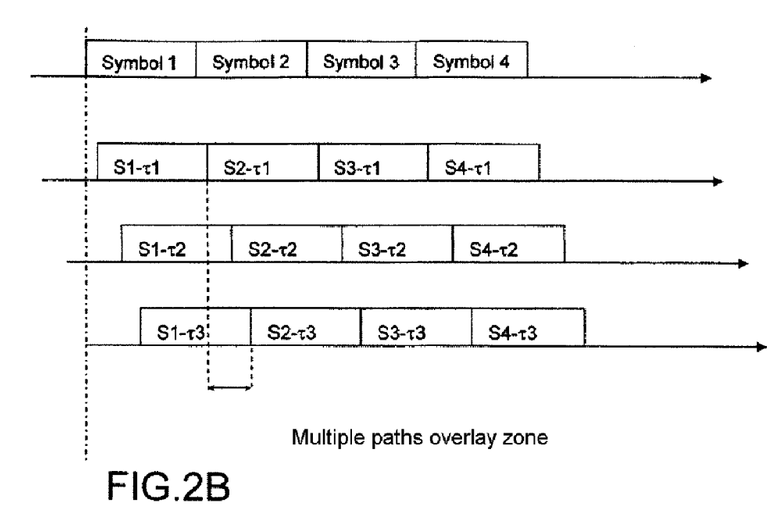
Figure 2C:
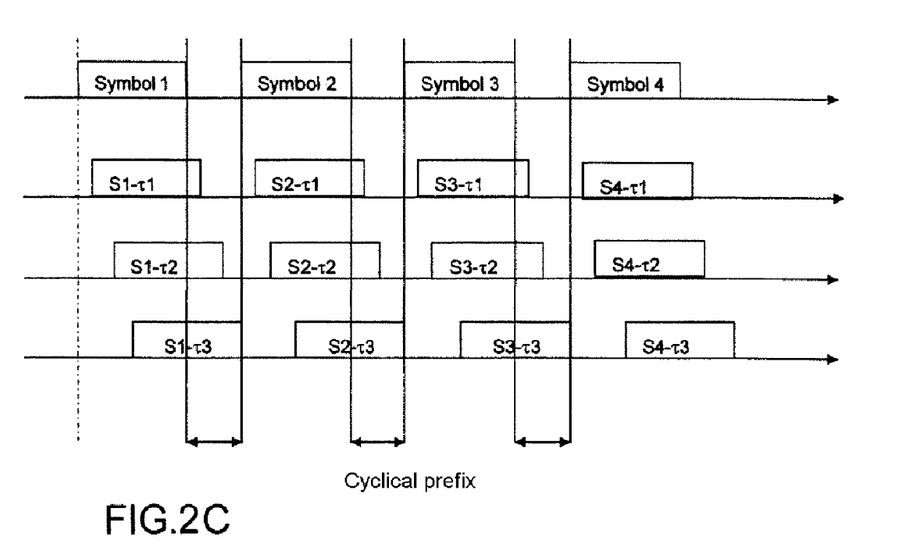

It is known from the prior art to use the orthogonal frequency-division multiplexing technique OFDM for frequency-hopping communications. FIGS. 1 and 2 represent a multiple-carrier modulation. The OFDM technique (Orthogonal Frequency Division Multiplexing) is a multiple-carrier modulation, that is, it consists of a set of orthogonal carriers. The orthogonality of the OFDM modulation is achieved by choosing harmonic frequencies of a base frequency and using them over a duration that is a multiple of the period of the base harmonic.

In the example given in FIG. 2A, 2B, 2C, 8 subcarriers are used ($f_0$, $2f_0$, $3f_0$, $4f_0$, $5f_0$, $6f_0$, $7f_0$, $8f_0$). However, as a general rule, also used is the continuous component which is orthogonal with any sinusoid if the energy is integrated over a duration equal to or a multiple of a period of $f_0$. In this case, the continuous component and the harmonics $f_0$ to $7f_0$ are used. Each of these harmonics is modulated by a signal to be transmitted with a modulation chosen from the phase modulations (BPSK, QPSK, etc.) or from the amplitude modulations (16QAM, 64QAM, 256QAM, etc.). The more effective the modulations are in transmission density per Hz used, the greater is the range reduction.

A transmitted symbol is a set of binary information transmitted on the different carriers of the OFDM multiplex. Thus, in the example of FIG. 2A, 2B, 2C, the symbol comprises binary information on the eight carriers $f_0$ to $8f_0$. Knowing that 1 bit, 2 bits, 4 bits, 6 bits, 8 bits are respectively deducted from a symbol in BPSK, QPSK, 16QAM, 64QAM and 256QAM modulations, all the information transmitted by a complete OFDM symbol is therefore, according to the above-mentioned modulations, 8, 16, 32, 48 or 64 bits.

Figure 3:
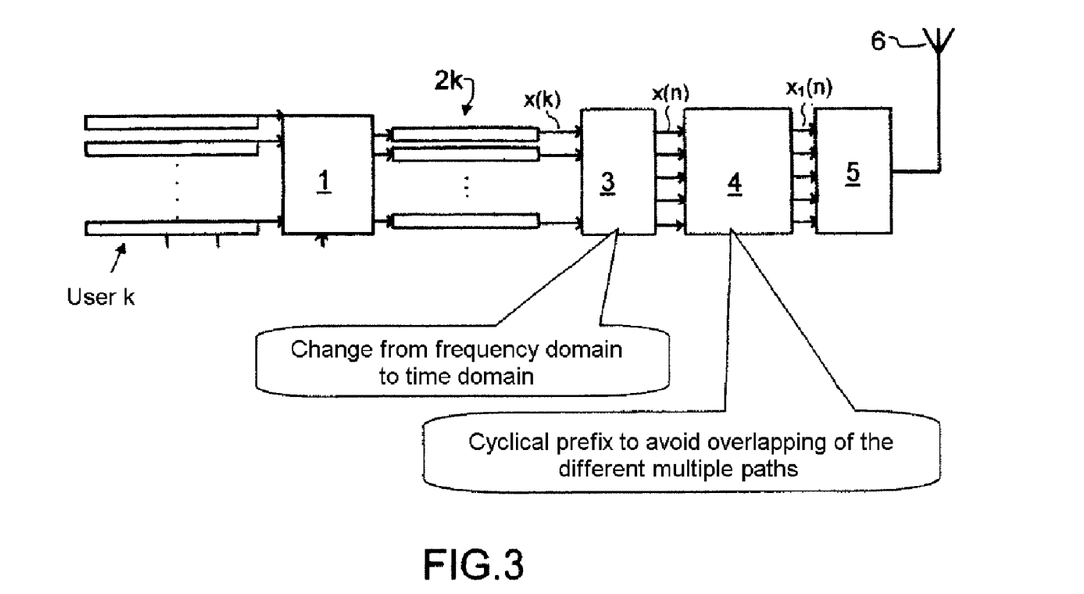

FIG. 3 diagrammatically represents an exemplary OFDMA sender (general case with several users within one and the same symbol). It comprises, for example, the following modules:
  A device 1 for allocating subcarriers according to the users with different modulations,
  Several "adaptive" modulation means, 2k, the number of these means is, for example, equal to the number of the users k,
  A device 3 adapted to switch from the frequency domain to the time domain,
  A device 4 for inserting a hold time or cyclical prefix to avoid overlaps of the different multiple-paths,
  A device 5 P/S (Parallel to Serial)
  A sending antenna 6.

Figure 4:
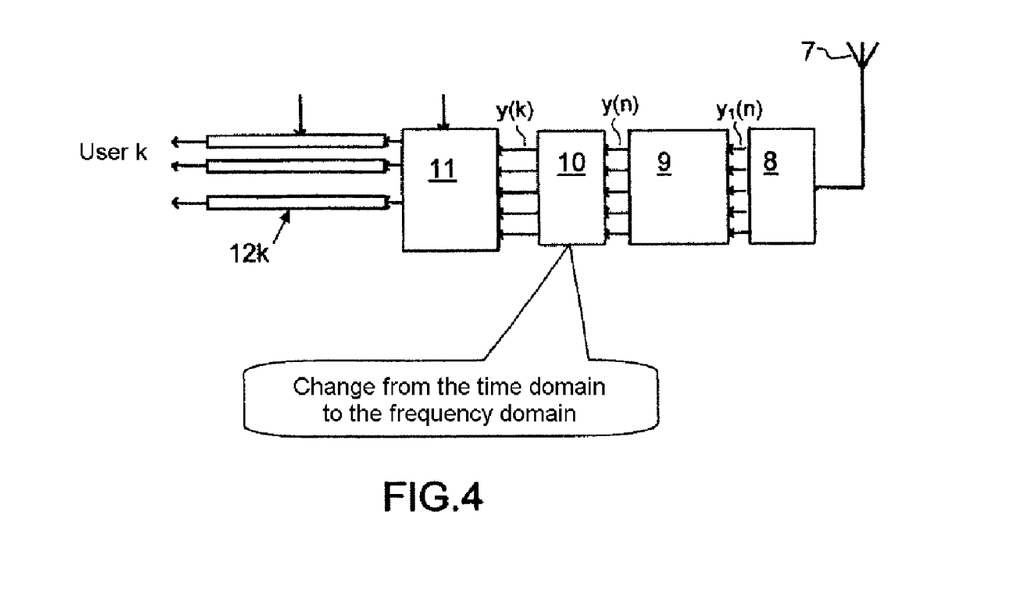

FIG. 4 represents an exemplary architecture for an OFDMA receiver. It comprises, for example, the following modules:
  A receiving antenna 7, linked to an S/P device 8
  device 9 adapted to delete the cyclical prefix introduced on sending,
  A device 10 for switching from the time domain to the frequency domain,
  A means 11 adapted to extract the subcarriers for each user k,
  Several adaptive demodulation devices 12k.

In certain standards, for example, HIPERLAN2 and IEEE802.16d, OFDM is used with a TDMA-type access protocol. The timeslot of the TDMA (Time division multiple access) cycle is then a whole number of OFDM symbols.

It is also possible to use OFDM to share access between several users by the sub-channelization technique, or with OFDMA (Orthogonal Frequency Division Multiple Access) where the N carriers are not allocated to a single user. The set of the N carriers is subdivided into M subsets of carriers. The resources are allocated subset by subset. The M users transmit concurrently, within the same OFDM symbol.

Figure 5:
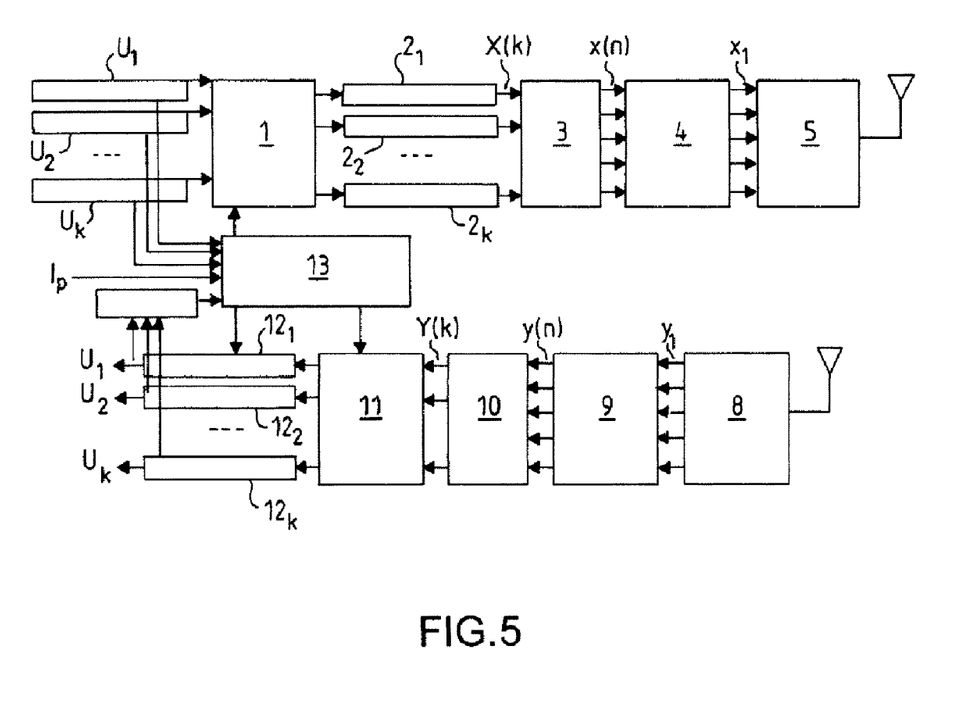

FIG. 5 diagrammatically represents a communication network architecture based on OFDMA. The latter requires an allocation of the resources between the different users. This allocation is dependent on the quality of service and the bit rate requested for each user and on the environment (response of the channel for each user, interference, etc.).

In the example of FIG. 5, K users communicate within one and the same OFDM symbol.

The identical modules in FIGS. 3, 4 and 5 bear the same references. In addition to the diagrams of FIGS. 3 and 4 respectively concerning a sender and a receiver, the OFDMA system notably comprises a resource allocation module 13 which receives the allocation requests from the different users, an indication concerning the maximum power needed, an indication concerning the channel of the user, and which delivers signals to the subcarrier allocation device, and to the device for extracting subcarriers for the different users, and to the adaptive demodulation modules.

Different resource allocation algorithms are available in the literature. These algorithms make it possible notably to allocate the subcarriers to the users and determine the modulation/coding type for each of these carriers. These algorithms are critical for making best use of OFDMA. In practice, the subcarriers that are "favorable" to a user, that is, those least affected by disturbances, of OFDMA may be unusable or less favorable to other users. The resource allocation algorithms are responsible for exploiting this diversity.

The FH-OFDMA (or Frequency Hopping OFDMA) concept is known from the prior art (Hikmet Sari 1997 "Orthogonal frequency-division multiple access with frequency hopping and diversity" in *Multi-carrier Spread-Spectrum*, K. Fazel and G. P. Fettweiss, Eds. Kluwer Academic Publishers, 1997, pp 57-68) in the case where the transmission channel is not known. Since a channel can contain carriers that are unusable because of interference, each user is assigned a sequence of carriers rather than a particular carrier. The sequence used is generally incremental.

Spectrum spreading is conventionally done by introducing at the radio level a synthesizer with fast tuning, of the order of 100 to 150 µs, to hop over a wide bandwidth.

Frequency hopping is applied to protect the synchronization of the nodes between themselves. In the case of a synchronization (time/frequency) using dedicated signals (case of the short and long preambles of 802.16), a synchronization protection may be implemented by a sequence of pseudo-randomly drawn signals. Thus, the synchronization patterns are not systematically the same, but vary, in addition, according to a sequence defined by pseudo-random drawing.

SUMMARY OF THE INVENTION

The aim of the invention is notably to overcome the above-mentioned drawbacks. To this end, the subject of the invention is a communication method in which the data passes over time-variable frequency bearers. A frequency bearer is defined as a subset pair of carriers (subchannel) in a channel of a set of frequency channels (RF). The choice of the frequency bearers is derived from a pseudo-random draw.

The method and the system according to the invention notably offer the following advantages:

having frequency hops over a large band on each start of frame, based on a pseudo-random law, having hops of shorter frequency intervals, but with zero tuning times, in the OFDMA band inside the frame for each slot (even same symbol in certain conditions), based on a pseudo-random second, not requiring a central point to organize the exchanges, allowing multimedia-type exchanges at very high bit rate, compatible with any access procedure, whether centralized such as, for example, TDMA (Time Division Multiple Access) or distributed like, for example, distributed TDMA.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all with out departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1, a review of multiple-carrier modulation and FIG. 2A an example of eight-carrier modulation, FIGS. 2B and 2C a set of successive symbols, FIG. 3, the diagram of an OFDMA sender, and FIG. 4 that of a receiver, FIG. 5, an exemplary architecture of an OFDMA emitter-receiver, FIG. 6, an exemplary structure of the combined frequency hopping according to the invention, FIGS. 7 and 8 two block diagrams of a device implementing the invention, FIG. 9 a transmission diagram from a central point to several users, FIGS. 10 and 11, a diagram of single-user access to each of the bands and an example of associated communications, FIGS. 12 and 13, a diagram of access in the case of multiple users and the associated communications, FIGS. 14, 15, 16 examples of implementation of the inventive method.

DETAILED DESCRIPTION OF THE INVENTION

The inventive method relies notably, in the context of transmissions between nodes, on the combination of conventional frequency hopping, by servo-controlling a synthesizer for example, and instantaneous by the use of partial blocks of subcarriers of a multiple-carrier modulation.

Figure 6:
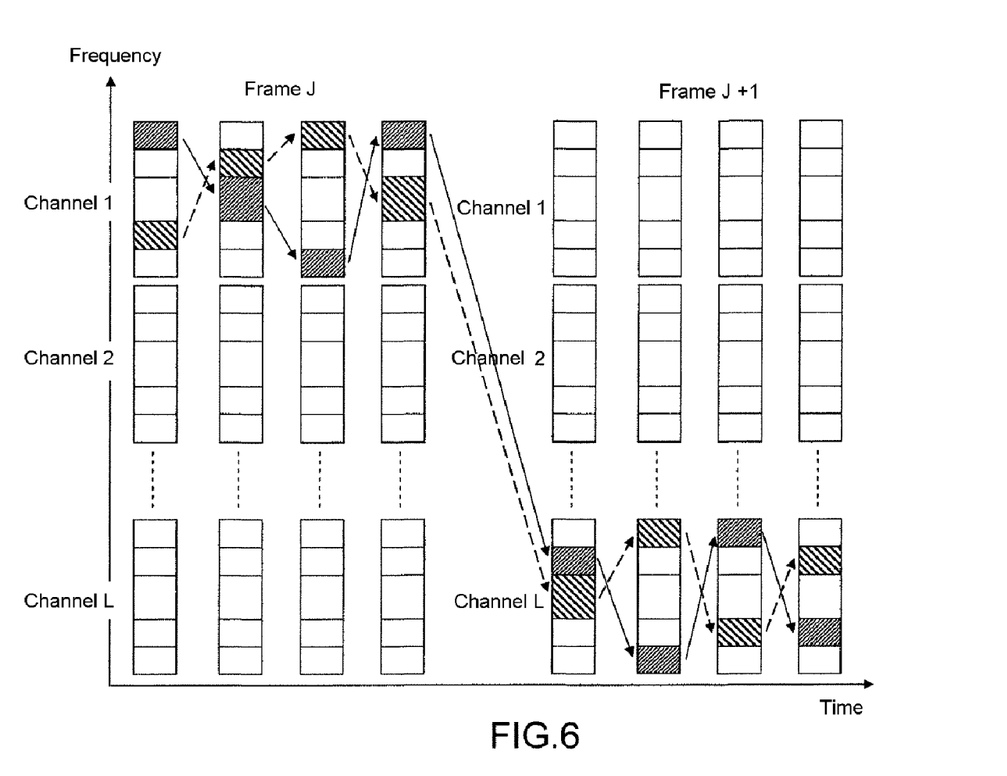

FIG. 6 diagrammatically represents a first exemplary implementation of the inventive method, in a time-frequency diagram.

In this figure, a channel represents a given radio frequency (RF) and, in this example, each channel Ci is split into sub-channels Cij. This is a "logical" split. A subchannel is a set of OFDM carriers that are not necessarily adjacent.

The method implements a double frequency hopping mechanism implemented by a suitable processor inserted, for example, into an existing device of COTS (Components Off The Shelf) type. An implementation on custom hardware is, however, perfectly possible.

Figure 7:
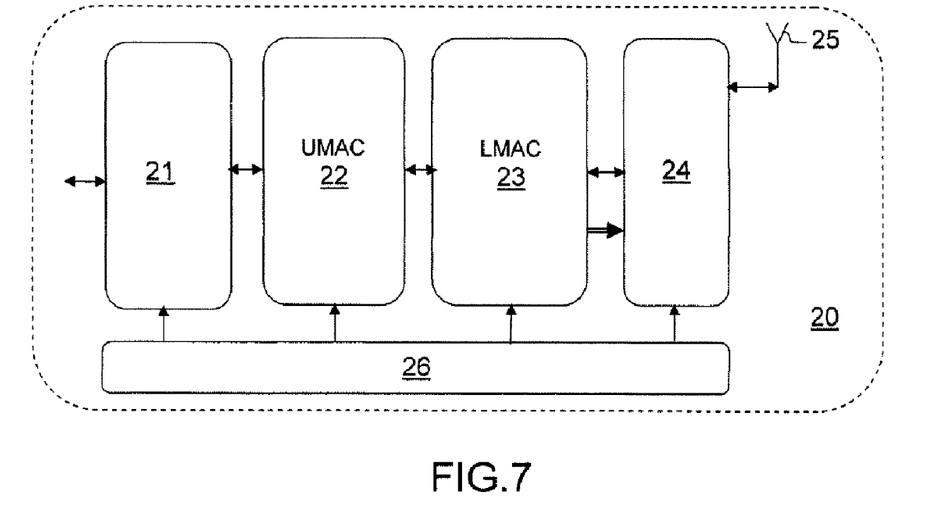

FIG. 7 represents an exemplary market-standard COTS product 20 making it possible to implement the inventive method.

The system comprises, for example, a network interface 21, linked with the upper MAC access layer (UMAC or Upper Medium Access Control) 22, communicating with the lower access layer 23, LMAC. At the level of this layer LMAC, there are a programmable component of FPGA (Field Programmable Gate Array) type and an ASIC PHY. All the elements are linked with an energy interface 26. The radio comprises a frequency synthesizer 24.

Figure 8:
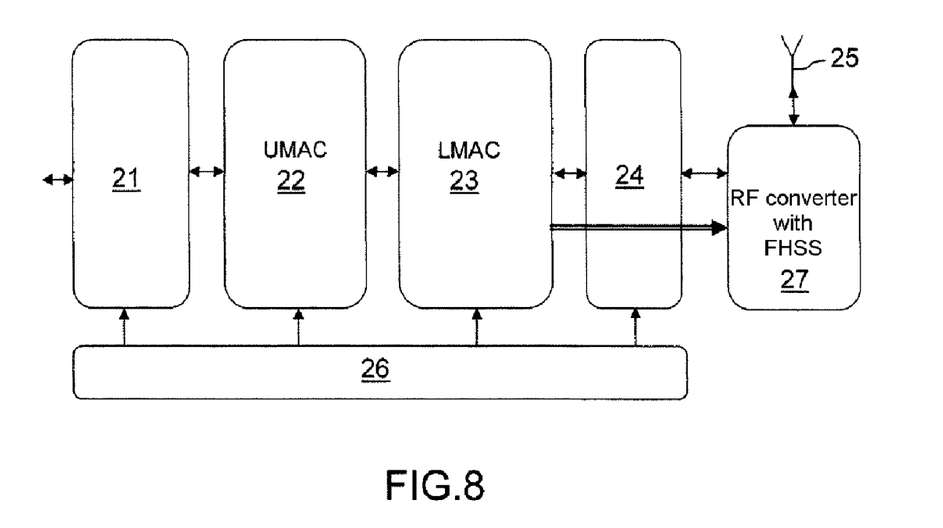

According to a second embodiment variant, based on COTS, represented in FIG. 8, in which the aim is to work in another range of frequencies, the native radio part is retained and conventional frequency hopping is introduced at the level of a radio frequency converter RF, 27, controlled by the digital part of this COTS.

The inventive method implements, for example, in the systems described in FIGS. 7 and 8:
the combined implementation of two independent pseudo-random hopping laws, one for channel hopping and the other for OFDMA subchannel hopping within a channel, or even
a single law managing both the transition from one channel to another and the operation of the subchannels within a channel.

All of the data transmitted and the signaling are protected by the frequency hopping.

It is possible to use a single law for the conventional frequency hopping on the one hand and the instantaneous frequency hopping on the other hand, by taking into account the constraints of the two aggregated bands. In practice, the combination of independent laws facilitates the reconciliation of the constraints of orthogonalities of the bands and adaptation of the number of carriers to the requested bit rate.

Thus, to take the case of a law aggregating conventional hops over N bands of BW MHz with possibilities of instantaneous hops on each of the N bands by M sub-bands of b MHz (M=BW/b), then the output of the algorithm is, for example, of the type:

$$\text{Pair}(nb,ns)=\text{draw}(n,i)$$

with nb=number of the band to be used, ns=number of the sub-band to be used, for the frame n and the symbol i.

In the case of the use of a sub-band and, more generally, of all the sub-bands for a single transmission, the hopping law is optimized to make best use of all of the frequency resources.

Figure 9:
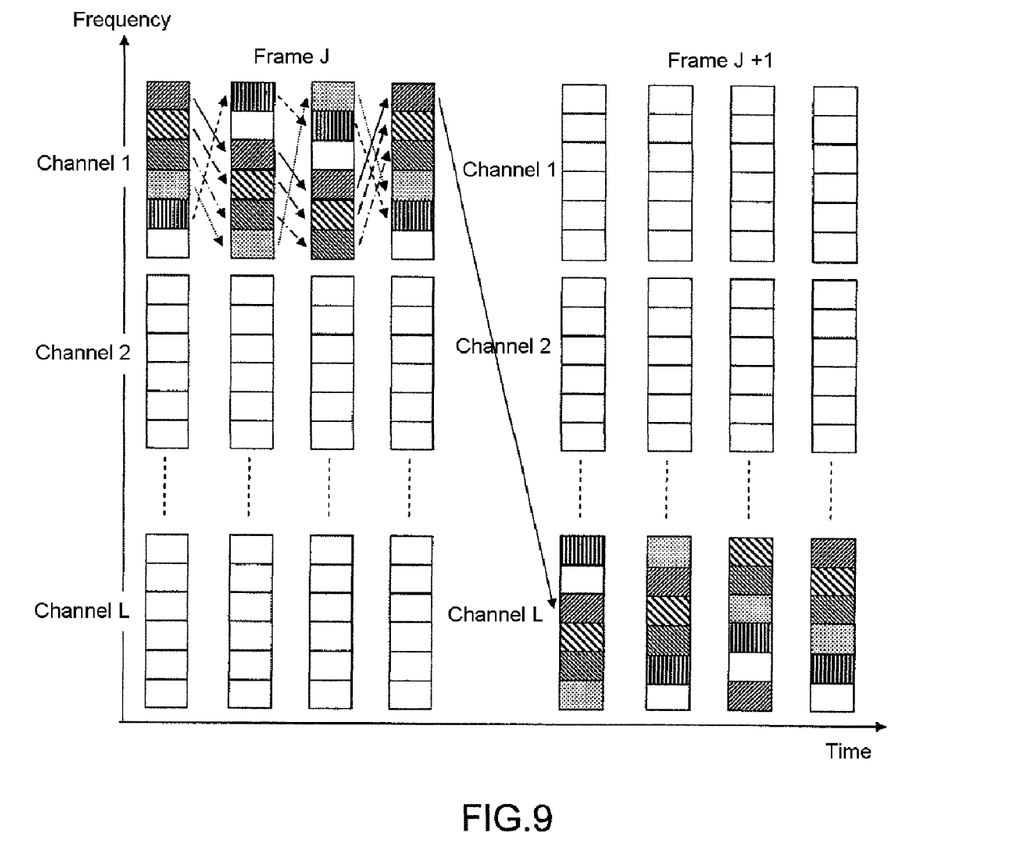

FIG. 9 represents the application of the method in the case of a transmission by a central point and for centralized multiple-user access.

One of the examples of application of the inventive method corresponds to the transmission of selective information streams to a set of terminals. In this case, the sender (or central point) is unique and all the connected users receive the stream of information intended for them through a sequence of frequency hops. The different streams can be protected by different hopping laws (most complex case) but also identical and offset as illustrated in FIG. 9.

The steps executed by the inventive method in the LMAC and UMAC parts of the structures, notably those described for example in FIGS. 7 and 8, are as follows:
At the level of the UMAC layer, before the start of each frame or of a GROUP of frames:
Preparation of the different frequency locations to be used for each symbol (i=1, I) in each channel used in the following frames k, k+1, . . . , k+N (N having a value, depending on the desired anticipation, from 1 to 4) for the transmission to a subscriber A:
Pair(nb,ns)$_{A,n,i}$=draw(n,i)
  for n: frame n° ranging from k to k+N
  for i: symbol n° ranging from 1 to I
  with nb=number of the band to be used
    ns=number of the sub-band to be used.

Similarly, preparation of the different frequency locations to be used for each symbol (i=1, I) in each channel used in the following frames k, k+1, . . . , k+N for the transmission to the subscriber B:
nb$_{B,n,i}$=nb
ns$_{B,n,i}$=(ns$_{A,n,i}$+1)modulo NS
with NS: number of sub-bands available in a channel
Note 1: These indices represent either physical values or logical values, i.e. of which the physical target values are known from a mapping table.
Note 2: The physical indices of sub-bands used are consecutive modulo NS.
Note 3: The sub-bands used can therefore be separate, that is, nonconsecutive, either because of the modulo in the case of physical indices, or implicitly thanks to the mapping table in the case of logical indices.
Similarly, preparation of the different frequency locations to be used for each symbol (i=1, I) in each channel used in the following frames k, k+1, . . . , k+N for the transmission to the subscriber C:
nb$_{C,n,i}$=nb
ns$_{C,n,i}$=(ns$_{B,n,i}$+1)modNS
with NS: number of sub-bands available in a channel
And so on for the set of subscribers D, . . .
In the central point, preparation of the different symbols (i=1, I) to be sent on the following frames k, k+1, . . . , k+N to the subscribers A, B, C, D, . . . : channels, respective frequency locations in the channel, respective information to be transmitted on these frequency locations,
Sending of the set of the channels, of the frequency locations, of the symbols to the LMAC part and to the modem.
At the LMAC level, before the start of each frame:
Application to the RF synthesizer of the channel number desired for the frame to come.
At the LMAC level, just before each symbol to be transmitted:
In the central point, sending to the PHY layer of the binary information to be transmitted on the respective frequency locations for fabrication by the PHY layer of the symbol to be transmitted.
The reception part is totally reciprocal.

Figure 10:
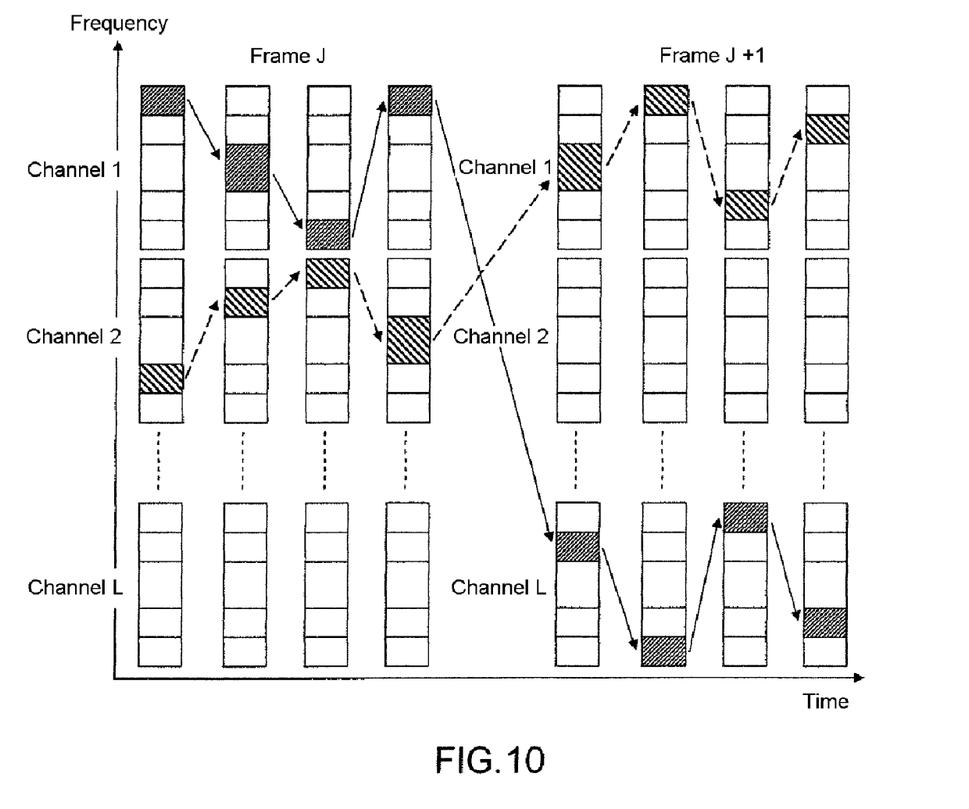

For example, on FIG. 10, A and B are the only one to communicate in channel 1, for the trame J, then they are sent through channel L for the trame J+1, C and D are the only one to communicate in the channel 2 for the trame J and jum in the channel 1 for the trame J+1.

The method coordinates the access of the different users to the different bands, even if a single user can access at a given instant the various sub-bands of a given band.

Figure 11:
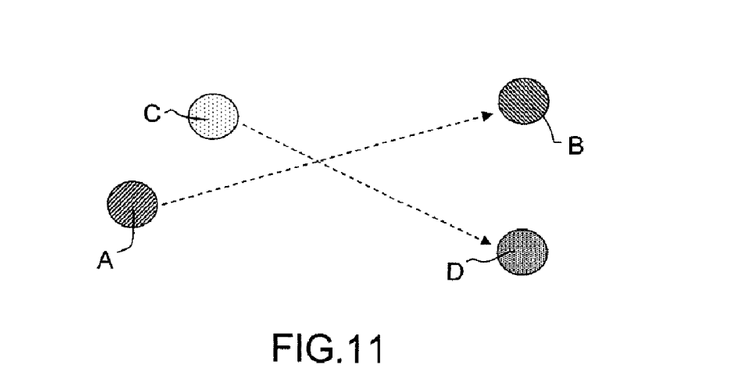

The operations to be carried out, the nodes being assumed to be in time synchronization, in the LMAC and UMAC parts of the structures, notably those represented in FIGS. 7 and 8, are as follows:
At the UMAC level of the nodes A and B (see FIG. 11), before the start of each frame or of a GROUP of frames:
Preparation of the different frequency locations to be used for each symbol (i=1, I) in each channel used in the following frames k, k+1, . . . , k+N (N having a value, depending on the desired anticipation, from 1 to 4) for the transmission between the subscriber A and the subscriber B:
Pair (nb,ns)$_{A,n,i}$=draw_1(n, i)
  for n: frame n° ranging from k to k+N
  for i: symbol n° ranging from 1 to I
  with nb$_{A,n,i}$=number of the band to be used in frame n
    ns$_{A,n,i}$=number of the sub-band to be used in the slot i of frame n.

At the UMAC level of the nodes C and D, before the start of each frame or of a GROUP of frames:
　Preparation of the different frequency locations to be used for each symbol (i=1, I) in each channel used in the following frames k, k+1, ..., k+N for the transmission between the subscriber C and the subscriber D:
　　Pair(nb,ns)$_{C, n, i}$=draw_2(n, i)
　　　for n: frame n° ranging from k to k+N
　　　for i: symbol n° ranging from 1 to I
　　　with nb$_{C, n, i}$=number of the band to be used in frame n
　　　　ns$_{C, n, i}$=number of the sub-band to be used in the slot i of the frame n
　　　　Function "draw_2" orthogonal to the function "draw_1".

At the UMAC level of the node A (respectively B), before the start of each frame or of a GROUP of frames:
　Preparation of the different symbols (i=1, I) to be sent (respectively received) on the following frames k, k+1, ..., k+N to the subscriber B (respectively from the subscriber A): channel, frequency location in the channel, information to be transmitted on the frequency location of each successive symbol considered,
　Sending of the set of the channels, of the frequency locations, of the symbols to the LMAC part (respectively reception of the symbols).

At the UMAC level of the node C (respectively D), before the start of each frame or of a GROUP of frames:
　Preparation of the different symbols (i=1, I) to be sent (respectively received) on the following frames k, k+1, ..., k+N to the subscriber D (respectively from the subscriber C): channel, frequency location in the channel, the information to be transmitted on the frequency location of each successive symbol considered,
　Sending of the set of the channels, of the frequency locations, of the symbols to the LMAC part (respectively reception of the symbols).

At the LMAC level for all the nodes, before the start of each frame:
　Application to the RF synthesizer of the channel number desired for the frame to come.

At the LMAC level, just before each symbol transmitted (respectively at the end of each symbol received):
　Sending to (respectively reception from) the PHY layer of the binary information to be transmitted (respectively to be received) on the respective frequency locations for fabrication by the PHY layer of the symbol to be transmitted/received.

Figure 12:
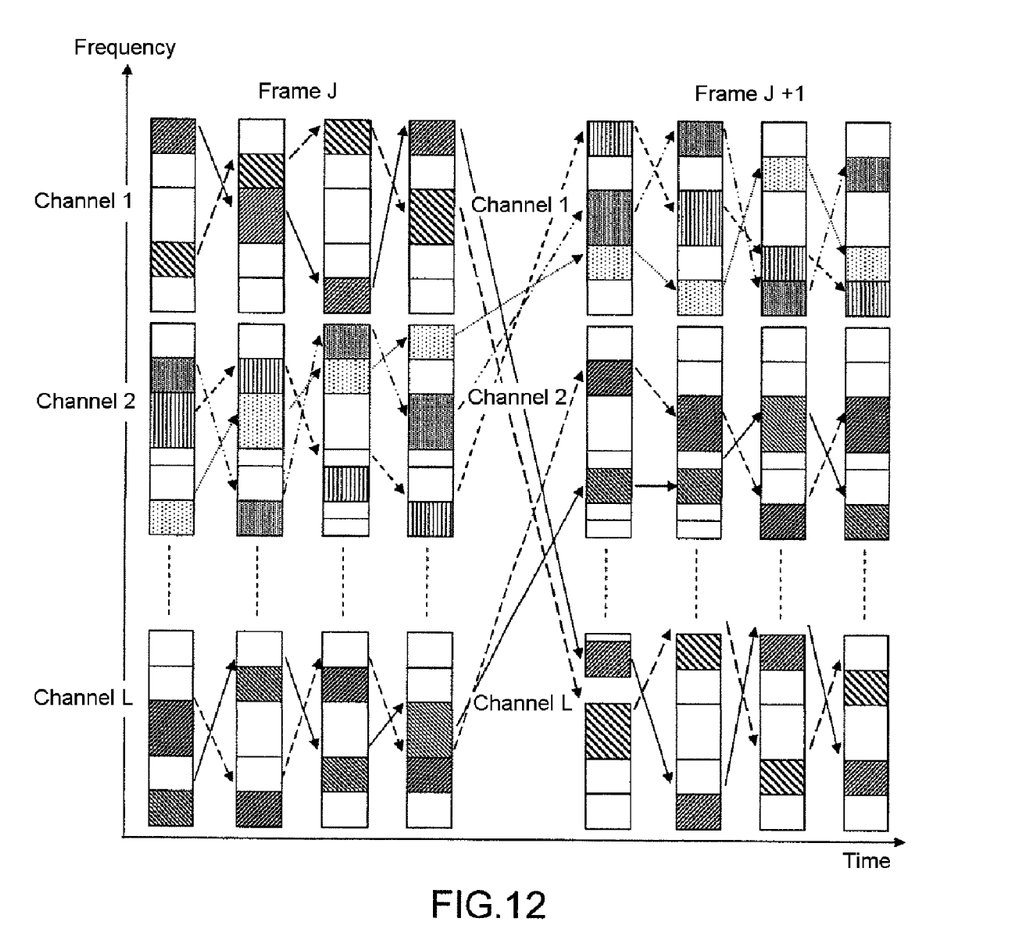
Figure 13:
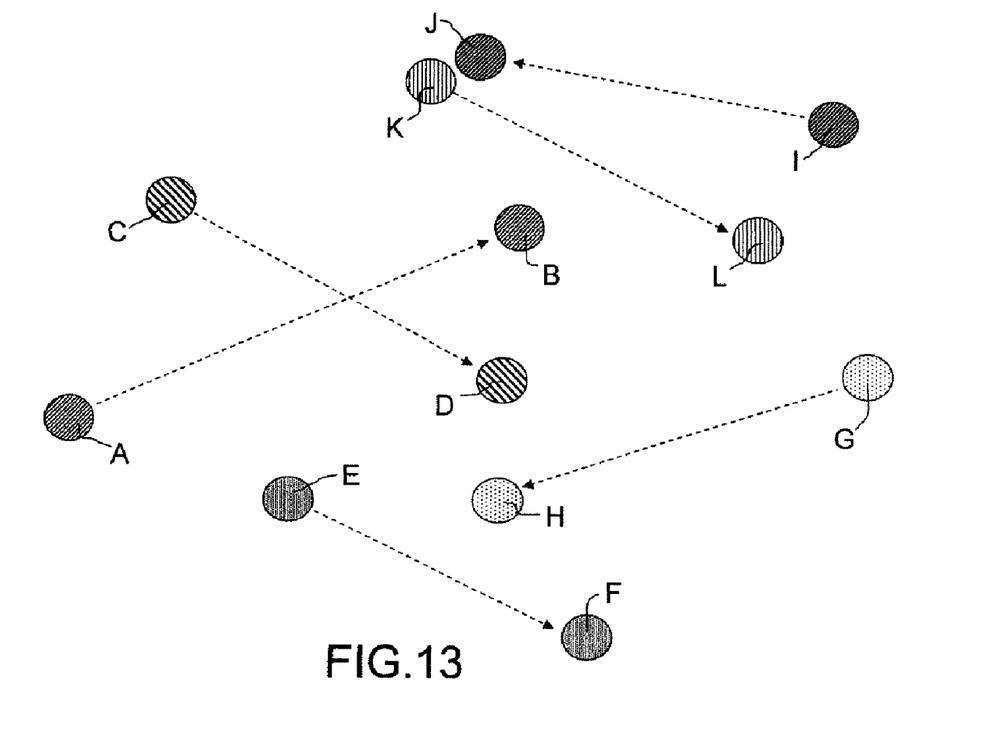

FIG. 12 represents an exemplary implementation for the general multiple-user case and FIG. 13 the distribution of the different users. The steps implemented in the inventive method are, for example, described hereinbelow.

The operations to be performed, the nodes being considered to be in time synchronization, in the LMAC and UMAC parts of the structures, notably those represented in FIGS. 7 and 8, are as follows:

At the UMAC level of all the nodes, before the start of each frame or of a GROUP of frames:
　Preparation of the different frequency locations to be used for each symbol (i=1, I) in each channel used in the following frames k, k+1, k+N (N possibly having a value, depending on the desired anticipation, from 1 to 4) for the transmission between the subscriber A and the subscriber B:
　　Pair(nb,ns)$_{A, n, i}$=draw_1(n, i)
　　　for n: frame n° ranging from k to k+N
　　　for i: symbol n° ranging from 1 to I
　　　with nb$_{A, n, i}$=number of the band to be used in frame n
　　　　ns$_{A, n, i}$=number of the sub-band to be used in the slot i of the frame n.

At the UMAC level of the nodes C and D, before the start of each frame or of a GROUP of frames:
　Preparation of the different frequency locations to be used for each symbol (i=1, I) in each channel used in the following frames k, k+1, ..., k+N for the transmission between the subscriber C and the subscriber D:
　　Pair(nb,ns)$_{C, n, i}$=draw_1a(n, i)
　　　for n: frame n° ranging from k to k+N
　　　for i: symbol n° ranging from 1 to I
　　　with nb$_{C, n, i}$=number of the band to be used in frame n
　　　　ns$_{C, n, i}$=number of the sub-band to be used in the slot i of the frame n
　　　　Function "draw_1a" orthogonal to the function "draw_1" for the drawing of the slots in the current channel, the drawn channels being identical between the two functions.

As above for the preparation of the frequency locations to be used for the transmissions between the subscribers E and F on the one hand and G and H on the other hand, but using the functions draw_2 and draw_2a,
　As above for the preparation of the frequency locations to be used for the transmissions between the subscribers I and J on the one hand and K and L on the other hand, but using the functions draw_3 and draw_3a.

At the UMAC level of the node A, before the start of each frame or of a GROUP of frames:
　Preparation of the different symbols (i=1, I) to be sent on the following frames k, k+1, ..., k+N to the subscriber B: channel, frequency location in the channel, information to be transmitted on the frequency location of each successive symbol considered,
　Sending of the set of the channels, of the frequency locations, of the symbols to the LMAC part.

At the UMAC level of the node C, before the start of each frame or of a GROUP of frames:
　Preparation of the different symbols (i=1, I) to be sent on the following frames k, k+1, ..., k+N to the subscriber D: channel, frequency location in the channel, information to be transmitted on the frequency location of each successive symbol considered,
　Sending of the set of the channels, of the frequency locations, of the symbols to the LMAC part.

And so on, for all the other sending nodes E, G, I, K, ...

At the LMAC level for all the nodes, before the start of each frame:
　Application to the RF synthesizer of the channel number desired for the frame to come.

At the LMAC level, for all the sending nodes, just before each symbol to be transmitted:
　Sending to the PHY layer of the binary information to be transmitted on the respective frequency locations for fabrication by the PHY layer of the symbol to be transmitted.

The reception part is totally reciprocal.

All the point-to-point communications, represented in the preceding configurations, can be generalized to "multicast" type communications.

Figure 14:
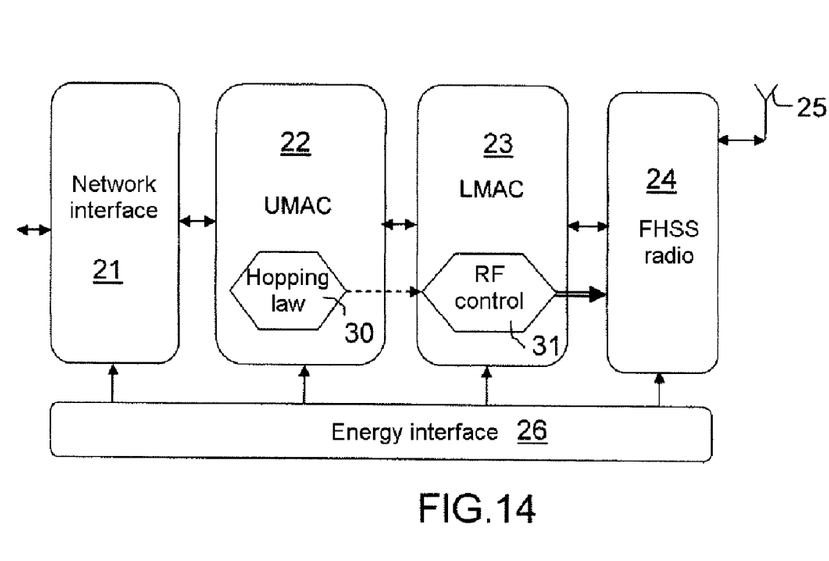

FIG. 14 represents an exemplary implementation in which the hopping law is integrated in the UMAC part and the RF control is integrated in the LMAC part. The two steps implemented consist in:

Step 1: generating the frequency for the next frame,
Step 2: controlling the RF card. Application of the controlled RF and of the last AGC (automatic gain control) associated with this frequency.

Figure 15:
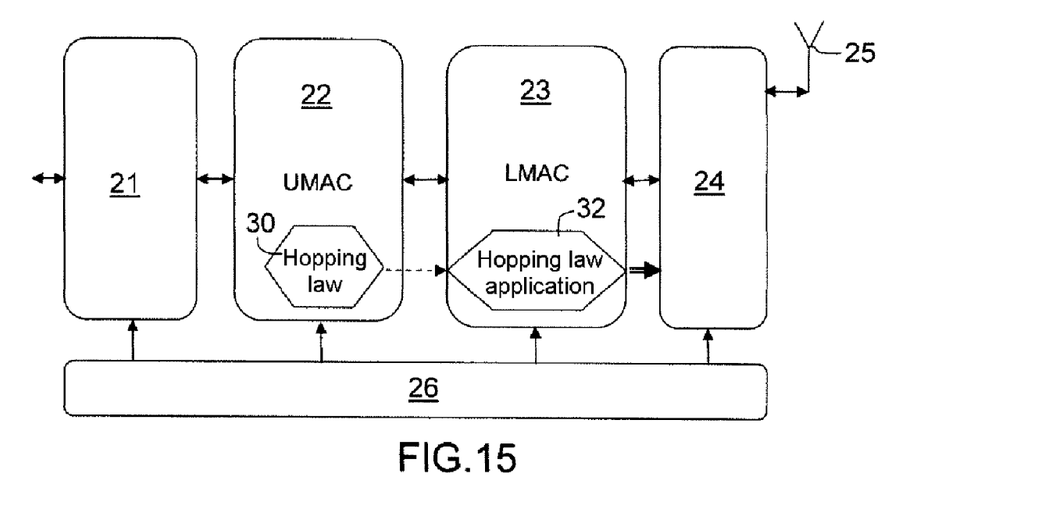

FIG. 15 represents an example in which the hopping law is integrated in the UMAC part and the application of the fast hopping law in the LMAC part. The steps are as follows:
Step 1: generation of the carriers to be used for the transmission of the next frame from a random law,
Step 2: in a PHY component or chip, synthesis of the OFDM symbol on the carriers assigned by the UMAC.

Figure 16:
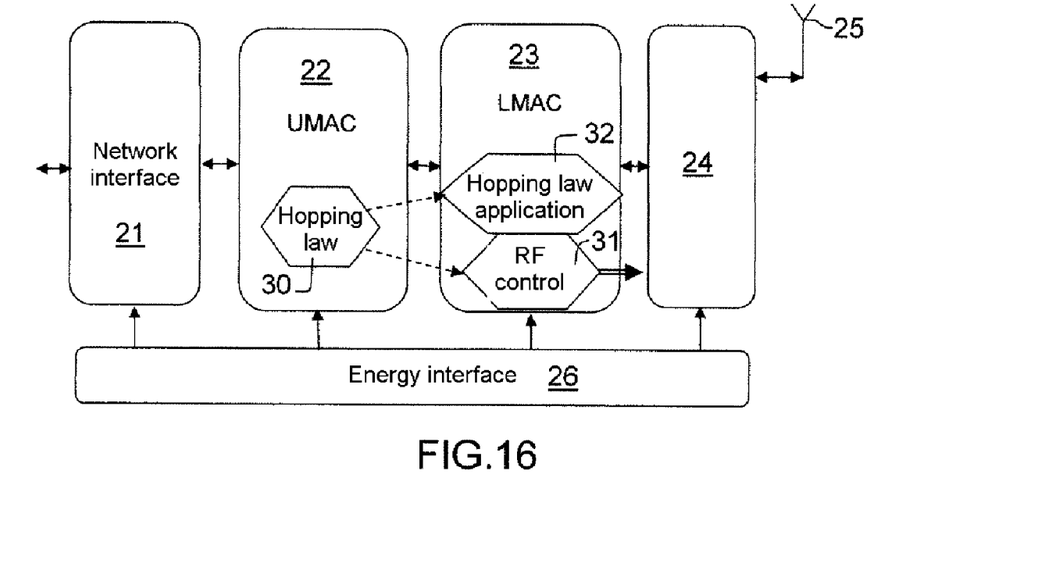

FIG. 16 represents another implementation variant which comprises the two steps:
Step 1: at the UMAC level:
  generation of the carriers to be used for the transmission of the next frame from a random law.
  generation of the frequency to be implemented in the next frame.
Step 2: at the LMAC level:
  PHY component: synthesis of the OFDM symbol on the carriers assigned by the UMAC.
  control of the RF card. Application of the controlled RF and of the last AGC associated with this frequency.

The different implementation variants described hereinabove apply notably for multi-service exchanges between vehicles moving within one and the same group.

The associated services are, for example, services for broadcasting video from one node to collateral nodes, the transferring of data between certain nodes according to the phases of changing of a network organization, of speech between all the network nodes.

The invention applies notably for the 802.16 standard in most of its modes, PMP mode, centralized MESH mode in which packets intended for remote subscribers, outside the range of the base station, are relayed at the highest bit rates by intermediate nodes, or even in the distributed MESH mode, which has the same function, but with a topology that is sufficiently complex for the base station no longer to be able to perform the allocation of the timeslots and to delegate it to each relaying node.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A communication method corresponding to a centralized multiple-user access case in which a central point transmits different information streams to one or more subscribers, the method comprising the following steps:
  passing data over time-variable frequency bearers, wherein a frequency bearer of the time-variable frequency bearers is defined as a subset pair of carriers in a channel of a set of frequency channels (RF), and
  choosing the time-variable frequency bearers by deriving the time-variable frequency bearers from a pseudo-random draw,
  at a UMAC (Upper MAC) access layer level, before a start of each frame or of a group of frames:
    preparing a first set of different frequency locations to be used for each symbol (i=1, ..., I) in each channel used in frames k, k+1, ..., k+N (N being an integer) for transmission between the central point and a first subscriber A:
    Pair(nb,ns)$_{A,n,i}$=draw(n, i)
      for n: frame No. ranging from k to k+N
      for i: symbol No. ranging from 1 to I
      with nb=number of a band to be used
        ns=number of a sub-band to be used
    preparing a second set of different frequency locations to be used for each of the symbols (i=1, ..., I) in each of the channels used in the frames k, k+1, ..., k+N for transmission between the central point and a subscriber B:
    nb$_{B,n,i}$=nb
    ns$_{B,n,i}$=(ns$_{A,n,i}$, +1)modulo NS
    with NS: number of sub-bands available in a channel,
    these indices represent either physical values or logical values,
    at the level of the central point, preparing different symbols (i=1, ..., I) for sending on the frames k, k+1, ..., k+N to the different subscribers A, B, C, D, ... : channels, respective frequency locations in the channel, respective information to be transmitted on these frequency locations,
    in each node, sending of the set of the channels, of the frequency locations, of the symbols to an LMAC (Lower MAC) part and to a modem (PHY layer),
  at the UMAC level of before the start of each frame:
    applying an RF synthesizer of a channel number desired for a frame to come, at the LMAC level, just before each symbol to be transmitted:
    in the central point, sending to the PHY layer binary information to be transmitted on the respective frequency locations for fabrication by the PHY layer of the symbol to be transmitted, the reception part being totally reciprocal.

2. A communication method corresponding to a multiple-user access case with a single user for each band, the method comprising the following steps, each node being considered to be in time synchronization, in LMAC and UMAC parts:
  passing data over time-variable frequency bearers, wherein a frequency bearer of the time-variable frequency bearers is defined as a subset pair of carriers in a channel of a set of frequency channels (RF), and
  choosing the time-variable frequency bearers by deriving the time-variable frequency bearers from a pseudo-random draw,
  at the UMAC level of nodes A and B, before a start of each frame or of a GROUP of frames:
    preparing a first set of different frequency locations to be used for each symbol (i=1, ..., I) in each channel used in frames k, k+1, ..., k+N (N having a value, depending on desired anticipation, from 1 to 4) for transmission between a subscriber A and a subscriber B:
    Pair(nb,ns)$_{A,n,i}$=draw_1 (n, i)
      for n: frame No. ranging from k to k+N
      for i: symbol No. ranging from 1 to I
      with nb$_{A,n,i}$=number of a band to be used in frame n
        ns$_{A,n,i}$=number of a sub-band to be used in slot i of the frame n,
  at the UMAC level of nodes C and D, before the start of each frame or of the GROUP of frames:
    preparing a second set of different frequency locations to be used for each of the symbols (i=1, ..., I) in each of the channels used in the frames k, k+1, k+N for transmission between a subscriber C and a subscriber D:
    Pair(nb,ns)$_{c,n,i}$=draw_2(n, i)
      for n: frame No. ranging from k to k+N
      for i: symbol No. ranging from 1 to I with nb $_{c,n,i}$=number of the band to be used in the frame n ns $_{c,n,i}$=number of the sub-band to be used in the slot i of the frame n function draw_2 orthogonal to function draw_1 at the UMAC level of the node A (respectively B), before the start of each frame or of the GROUP of frames:

preparing different symbols (i=1, I) to be sent (respectively received) on the frames k, k+1, . . . k+N to the subscriber B (respectively from the subscriber A): channel, frequency location in the channel, information to be transmitted on the frequency locations of each successive symbol considered, sending of the set of the channels, of the frequency locations, of the symbols to the LMAC part (respectively reception of the symbols), at the UMAC level of the node C (respectively D), before the start of each frame or of the GROUP of frames:

preparing the different symbols (i=1, I) to be sent (respectively received) on the frames k, k+1, . . . , k+N to the subscriber D (respectively from the subscriber C): channel, frequency location in the channel, information to be transmitted on the frequency location of each successive symbol considered, sending of the set of the channels, of the frequency locations, of the symbols to the LMAC part (respectively reception of the symbols), at the LMAC level for all the nodes, before the start of each frame:

applying to an RF synthesizer of a channel number desired a the frame to come, at the LMAC level, just before each symbol transmitted (respectively at the end of each symbol received):

sending to (respectively reception from) a PHY layer binary information to be transmitted (respectively to be received) on the respective frequency locations for fabrication by the PHY layer of the symbol to be transmitted/received.

3. A communication method corresponding to a generalized multiple-user access case, the method comprising the following steps:

passing data over time-variable frequency bearers, wherein a frequency bearer of the time-variable frequency bearers is defined as a subset pair of carriers in a channel of a set of frequency channels (RF), and choosing the time-variable frequency bearers by deriving the time-variable frequency bearers from a pseudo-random draw, at a UMAC level of all nodes, before a start of each frame or of a GROUP of frames:

preparing a first set of different frequency locations to be used for each symbol (i=1, I) in each channel used in the frames, k, k+1, . . . , k+N (N having a value, depending on desired anticipation, from 1 to 4) for transmission between a subscriber A and a subscriber B:

Pair(nb,ns)$_{A,n,i}$ =d raw_1 (n, i)

for n: frame No. ranging from k to k+N for i: symbol No. ranging from 1 to I with nb $_{A,n,i}$=number of the a band to be used in frame n ns $_{A,n,i}$=number of the a sub-band to be used in slot i of the frame n, at the UMAC level of nodes C and D, before the start of each frame or of the GROUP of frames:

preparing a second set of different frequency locations to be used for each of the symbols (i=1, I) in each of the channels used in the frames k, k+1, . . . , k+N for transmission between a subscriber C and a subscriber D:

Pair(nb,ns)$_{c,n,i}$=draw_1a(n, i)

for n: frame No. ranging from k to k+N for i: symbol No. ranging from 1 to I with nb $_{c,n,i}$ =number of the band to be used in the frame n ns $_{c,n,i}$=number of the sub-band to be used in the slot i of the frame n function draw_1a orthogonal to function draw_1 for drawing of slots in a current channel, the drawn channels being identical between the two functions, as above for the preparation of the frequency locations to be used for transmissions between subscribers E and F and transmissions between subscribers G and H, but using functions draw_2 and draw_2a, as above for the preparation of the frequency locations to be used for transmissions between subscribers I and J and transmissions between subscribers K and L, but using functions draw_3 and draw_3a, at the UMAC level of node A, before the start of each frame or of the GROUP of frames:

preparing the different symbols (i=1, I) to be sent on the frames k, k+1, . . . , k+N to the subscriber B: channel, frequency location in the channel, information to be transmitted on the frequency location of each successive symbol considered, sending of the set of the channels, of the frequency locations, of the symbols to an LMAC part, at the UMAC level of the node C, before the start of each frame or of a GROUP of frames:

preparing the different symbols (i=1, I) to be sent on the frames k, k+1, . . . , k+N to the subscriber D: channel, frequency location in the channel, information to be transmitted on the frequency location of each successive symbol considered, sending of the set of the channels, of the frequency locations, of the symbols to the LMAC part, at the LMAC level for all the nodes, before the start of each frame:

applying an RF synthesizer of a channel number desired for a frame to come, at the LMAC level, for all the sending nodes, just before each symbol to be transmitted:

sending to a PHY layer binary information to be transmitted on the respective frequency locations for fabrication by the PHY layer of the symbol to be transmitted, the reception part being totally reciprocal.

4. The method as claimed in claim 1, wherein two independent pseudo-random hopping laws are combined, a first being adapted to channel hopping and a second to sub-channel hopping.

5. The method as claimed in claim 2, wherein two independent pseudo-random hopping laws are combined, a first being adapted to channel hopping and a second to sub-channel hopping.

6. The method as claimed in claim 3, wherein two independent pseudo-random hopping laws are combined, a first being adapted to channel hopping and a second to sub-channel hopping.

7. The method as claimed in claim 1 wherein the transmissions implement 802.16 protocol.

8. The method as claimed in claim 2 wherein the transmissions implement 802.16 protocol.

9. The method as claimed in claim 3 wherein the transmissions implement 802.16 protocol.

10. The method as claimed in claim 4 wherein the transmissions implement 802.16 protocol.

11. The method as claimed in claim 5 wherein the transmissions implement 802.16 protocol.

12. The method as claimed in claim 6 wherein the transmissions implement 802.16 protocol.

* * * * *